(12) United States Patent
Hanafusa

(10) Patent No.: US 6,742,290 B2  
(45) Date of Patent: Jun. 1, 2004

(54) SNOW REMOVING MACHINE

(75) Inventor: Jitsumi Hanafusa, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/124,351

(22) Filed: Apr. 16, 2002

(65) Prior Publication Data

US 2002/0152646 A1 Oct. 24, 2002

(30) Foreign Application Priority Data

Apr. 18, 2001 (JP) ........................................ 2001-120394  
Sep. 13, 2001 (JP) ........................................ 2001-278556

(51) Int. Cl.⁷ ............................ E01H 5/09; B60K 25/00  
(52) U.S. Cl. ........................................ 37/248; 180/53.7  
(58) Field of Search ................................ 180/53.7, 233, 180/257; 37/248, 244, 252, 256

(56) References Cited

U.S. PATENT DOCUMENTS

| 4,278,161 A | 7/1981 | Mower et al. ................ 192/84 |
| 4,825,970 A | * 5/1989 | McVicar et al. ........... 180/53.7 |

FOREIGN PATENT DOCUMENTS

| JP | 02009332 | 1/1990 |
| JP | 2700620 | 10/1997 |

OTHER PUBLICATIONS

Patent Abstract of Japan, publication No. 2001-279629, publication date of application Oct. 10, 2001, application No. 2000-092442.  
Patent Abstract of Japan, publication No. 2001-320575, publication date of application Nov. 24, 2000, application No. 11-128509.

* cited by examiner

Primary Examiner—Robert E. Pezzuto  
(74) Attorney, Agent, or Firm—Adams & Wilks

(57) ABSTRACT

A snow removing machine having an electromagnetic clutch mounted to an output shaft of an engine, and a drive pulley. The electromagnetic clutch is mounted to a proximal end of the output shaft to be remotely separate from the engine. As a result, heat generated in the engine during operation thereof is not directly transferred to the electromagnet clutch whose magnetic force generated during operation is not deteriorated. The drive pulley is mounted to the output shaft at an area closer to the engine. The drive pulley has a lower weight than the electromagnet clutch, thereby mitigating load to be exerted to a part which supports the output shaft.

12 Claims, 8 Drawing Sheets

(COMPARATIVE EXAMPLE)

(PRESENT EMBODIMENT)

ical or counter movement. Such an action the yoke experiences in response to turning on or turning off of the excitation coil is hereinafter referred to as an "interlocking phenomenon of the voice". To this end, the detent member extends from the yoke and is provided with

SNOW REMOVING MACHINE

FIELD OF THE INVENTION

This invention relates to a snow removing machine having a structure wherein rotation power of an engine is transmitted through a clutch mechansim to an auger and a blower.

BACKGROUND OF THE INVENTION

Electromagnetic clutches for working machines have heretofore been known from, for example, Japanese Utility Model Laid-Open Publication No. HEI-2-9332 entitled "Electromagnetic Clutch" and Japanese Patent No. 2700620 entitled "Electromagnetic Connecting Apparatus".

The electromagnetic clutch disclosed in Japanese Utility Model Laid-Open Publication No. HEI-2-9332 has a rotor fixedly secured to a rotary shaft via a key. A V-pulley is rotatably mounted to a rotary shaft. An armature is mounted to one side of the V-pulley. The armature is moved into or away from the rotor to provide coupled or uncoupled conditions of the clutch in response to turning-on or turning-off states of a field core which is composed of a yoke and an excitation coil. A detent plate is mounted to an outside area of the field core and is fixedly secured to a stationary part of equipment by means of bolts, thereby precluding the field core involving the yoke from rotating in association with rotation of the rotor. Since, however, the electromagnetic clutch has a structure wherein the detent plate is merely secured to the stationary part of the equipment by the bolts, a frame body is directly suffered with reaction caused when the electromagnetic clutch is turned on/off, inevitably causing vibrations in the equipment.

The electromagnetic coupling device disclosed in Japanese Patent No. 2700620 comprises an electromagnetic spring clutch (electromagnetic clutch) which includes a yoke formed with a detent recess with which a detent pin extending from an equipment body is held in engagement. For this reason, when the electromagnetic clutch is turned on/off, the detent pin extending from the equipment body leaps in the detent recess formed in the yoke, resulting in generation of noise in the equipment.

SUMMARY OF THE INVENTION

It is therefore an object of the present invention to provide a snow removing machine which is capable of extending a maintenance cycle and makes a maintenance work easy.

According to an aspect of the present invention, there is provided a snow removing machine which comprises a prime mover, an output shaft for outputting power of the prime mover, an electromagnetic clutch located at a distal end of the output shaft, a drive pulley located at a proximal end of the output shaft, and a snow-removing work section, designed to be driven by power transmitted from the output shaft to the drive pulley and a transmission belt via the electromagnetic clutch, for performing snow-removing work.

Provision of the electromagnetic clutch at the proximal end of the output shaft leads to the advantages that the electromagnetic clutch is kept away from the prime mover to thereby prevent heat generated by the prime mover from being directly transferred to the electromagnetic clutch and an adequate amount of space is provided for easy maintenance of the electromagnetic clutch.

The output shaft is rotatably mounted to a cylinder block of the prime mover via a bearing. Thus, the smaller a bending moment applied to the output shaft becomes, the less a load applied to the bearing becomes. This invention therefore contemplates positioning the drive pulley at the proximal end of the output shaft, that is, an area close to the engine, to make the bending moment applied to the output shaft small to thereby decrease the load applied to the bearing supporting the output shaft.

In a desired form, the electromagnetic clutch comprises a main member coupled to the output shaft for joint rotation with the latter, a submember mounted to the drive pulley in opposed relation to the main member, and a yoke having an excitation coil, the submember being designed to be pulled tightly against the main member upon energization of the excitation coil so that rotational power is transmitted from the main member to the drive pulley. In addition, a detent member is provided to project from the yoke for preventing rotation of the yoke in unison with the main member, the yoke being connected to an anchoring member via a resilient member mounted to the detent member.

With the submember disposed in opposed relation to the main member, the submember, upon energization of the excitation coil, is attracted to or pulled against the main member, whereby rotational power is transmitted from the main member to the submember. When the excitation coil is held in an ON state, the an attracting force is exerted on the yoke which is liable to cause the yoke to rotate in unison with the main member. When the excitation coil is shifted from the ON state to an OFF state, the attracting force applied to the yoke abruptly disappears to thereby make the yoke encounter a reactive or counter movement. Such an action the yoke experiences in response to turning on or turning off of the excitation coil is hereinafter referred to as an "interlocking phenomenon of the voice". To this end, the detent member extends from the yoke and is provided with the resilient member through which the yoke is connected to the anchoring member forming part of a body frame of the machine. This makes it possible to mitigate the "interlocking phenomenon of the yoke" that otherwise occurs when the excitation coil is turned on or turned off. This leads to reduction in vibration or noise arising from an operation of the electromagnetic clutch.

It is desirable that for securing the yoke to the anchoring member, the anchoring member includes a support bracket with a pair of support walls for limiting movement of the detent member, the support walls retaining the resilient member in a sandwiched fashion. As a result, the detent member is held stationary to suppress the interlocking phenomenon, and the resilient member absorbs the reaction that the yoke experiences upon shifting between the turning on and turning off of the coil. Movement of the detent member is suppressed by providing the support walls in such a manner as to sandwich the detent member. Moreover, with the resilient member retained by the support bracket along its entire periphery, vibration of the electromagnetic clutch in all directions can be prevented.

BRIEF DESCRIPTION OF THE DRAWINGS

Certain preferred embodiments of the present invention will be described in detail below, by way of example only, with reference to the accompanying drawings, in which.

DETAILED DESCRIPTION OF THE PREFERRED EMBODIMENTS

Figure 1:
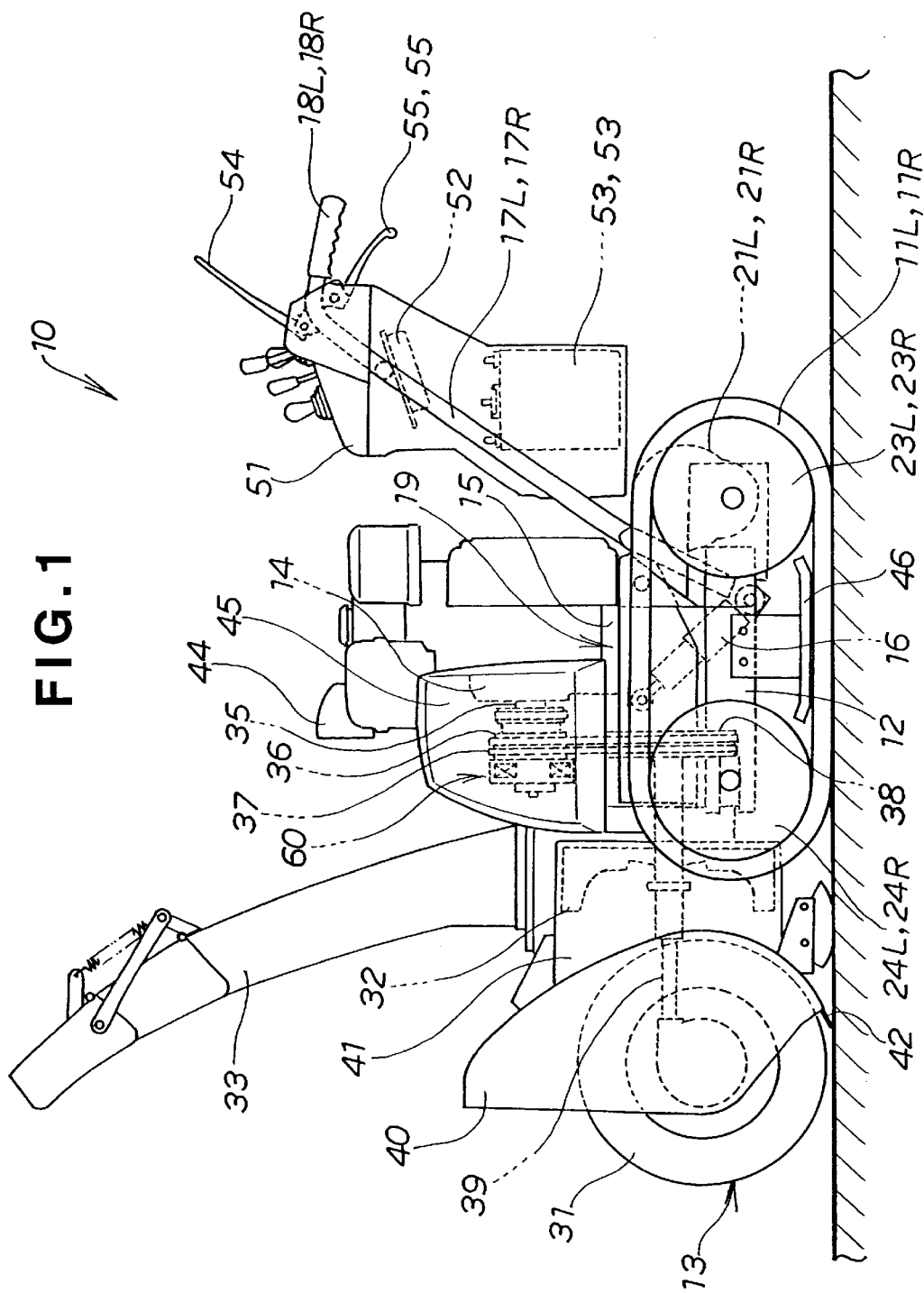
FIG. 1 is a side view illustrating a snow removing machine according to a preferred embodiment of the present invention.
Figure 2:
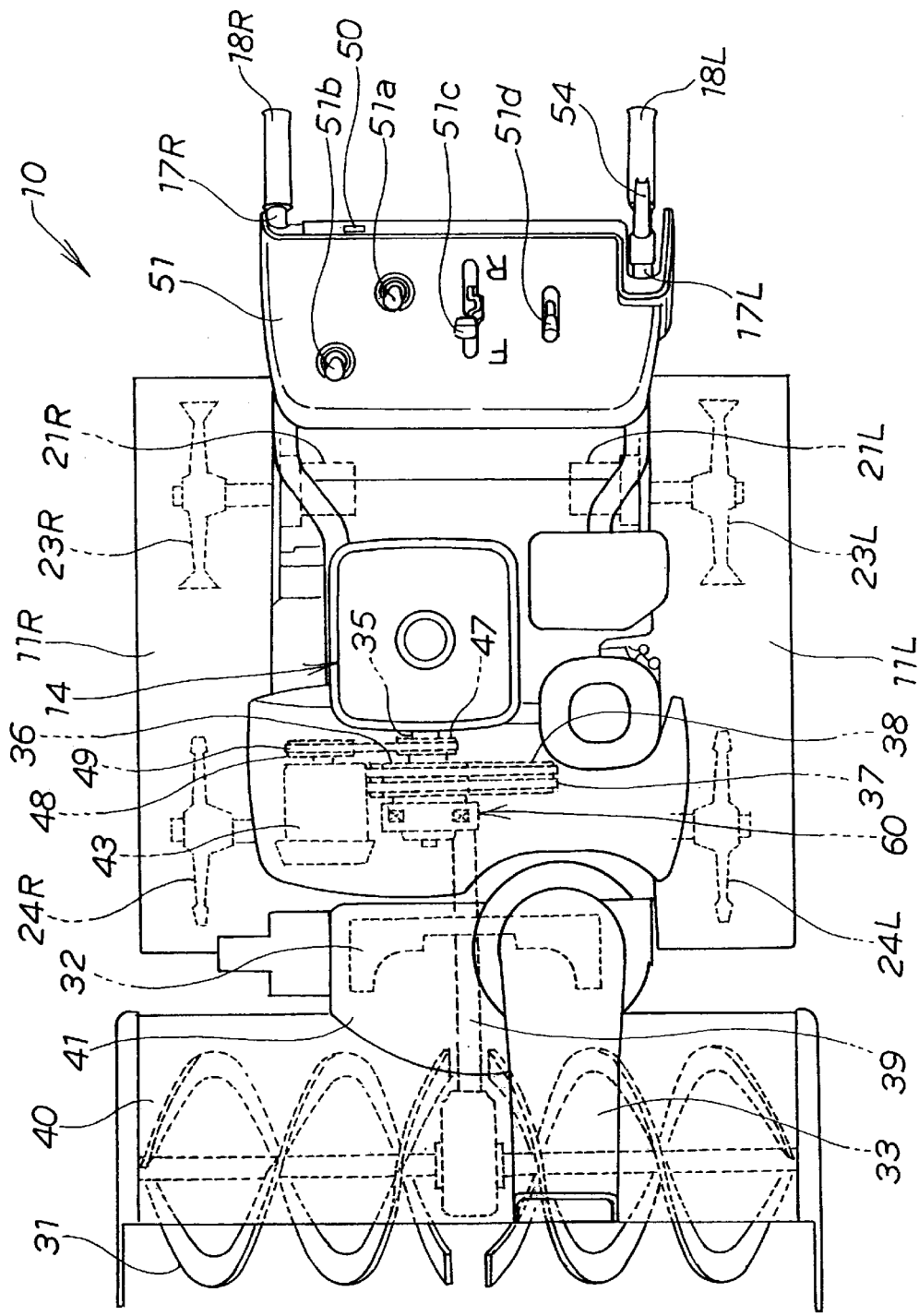
FIG. 2 is a plan view of the snow removing machine shown in FIG. 1.

Referring now to FIGS. 1 and 2, a snow removing machine 10 includes a travel frame 12 mounted to a body frame 15 for vertical swinging movement. The travel frame 12 has left and right crawler belts 11L, 11R. The body frame 15 has a snow-removing work section 13 and an engine 14 for driving the snow-removing work section 13. A front portion of the body frame 15 is operated for vertically swinging movement by a frame lift mechanism 16. Left and right operating handles 17L, 17R extend rearwardly and upwardly from a rear portion of the travel frame 12.

An operator controls operation of the snow removing machine 10 using the operating handles 17L, 17R while walking from behind as the snow removing machine 10 travels. In this embodiment, an operation panel 51, control unit 52 and two batteries 53 are located in such sequence in an area between the left and right operating handles 17L, 17R.

The left operating handle 17L has a brake operation lever 54 in the vicinity of a left grip 18L. A clutch operation button 50, which effects connection and disconnection of a clutch as shown in FIG. 2, is located on the operation panel 51 closely to the right operating handle 17R. The left and right operating handles 17L, 17R have snow-removing machine turning operation levers 55, 55 provided closely to the left and right grips 18, 18, respectively.

The brake operation lever 54 is designed to effect ON/OFF switching of an electromagnetic brake for braking left and right electric motors 21L, 21R. The clutch operation button 50 is designed to effect ON/OFF switching of an electromagnetic clutch 60.

The snow removing machine 10 transmits motive power supplied from a crankshaft 35, serving as an output shaft of the engine 14, to the snow-removing work section 13 via a drive pulley 36 and transmission belts 37, 37. The electromagnetic clutch 60 is mounted to a distal end portion of the crankshaft 35. The drive pulley 36 is mounted to a proximal end of the crankshaft 35.

The snow-removing work section 13 comprises an auger 31, a blower 32 and a shooter 33 mounted at a front portion of the body frame 15. The auger 31 and the blower 32 are rotated by a rotary shaft 39. The power outputted from the crankshaft 35 is transmitted to the drive pulley 36 via the electromagnetic clutch 60. Rotary motion of the drive pulley 36 is transmitted to a driven pulley 38 via the transmission belts 37, 37. Rotation of the driven pulley 38 makes the rotary shaft 39 rotate, thereby rotating the auger 31 and the blower 32. The blower 32 discharges snow collected by the auger 31 to a remote place via the shooter 33.

In FIGS. 1 and 2, reference numeral 40 designates an auger case, while reference numeral 41 designates a blower case. Reference numeral 42 designates a scraper, and reference numeral 43 designates a charging generator. Reference numeral 44 denotes a lamp, and reference numeral 45 designates a cover for concealing the electromagnetic clutch 60. Reference numeral 46 designates a belt urging member for pressing the crawler belts 11L, 11R toward a snow surface. A body 19 is comprised of the travel frame 12 and the body frame 15.

As shown in FIG. 2, the left and right electric motors 21L, 21R serve as sources of drive power for the left and right crawler belts 11L, 11R. The left and right drive wheels 23L, 23R are located in rear areas of the left and right crawler belts 11L, 11R. Left and right idle wheels 24L, 24R are located in front areas of the left and right crawler belts 11L, 11R. Rotary motions of the electric motors 21L, 21R are transmitted to the left and right drive wheels 23L, 23R, respectively, whose rotary motions in turn drive the left and right crawler belts 11L, 11R to allow the snow removing machine 10 to be self-propelled.

A generator drive pulley 47 is mounted to the crankshaft 35 extending forwardly from the engine 14. A V-belt 49 is trained around the generator drive pulley 47 and a driven pulley 48 for the charging generator 43 to permit rotary motion of the crankshaft 35 to be transmitted to the charging generator 43 for charging via the V-belt 49.

Mounted to the operation panel 51 are a lift operation lever 51a or operating the frame lift mechanism 16 shown in FIG. 1, a shooter operation lever 51b for changing a shooting direction of the shooter 33, an operation lever 51c for shifting forward/rearward movements of the snow removing machine 10 and for operating a travel spend of the latter, and a throttle lever 51d for controlling the rotational speed of the engine 14.

Figure 3:
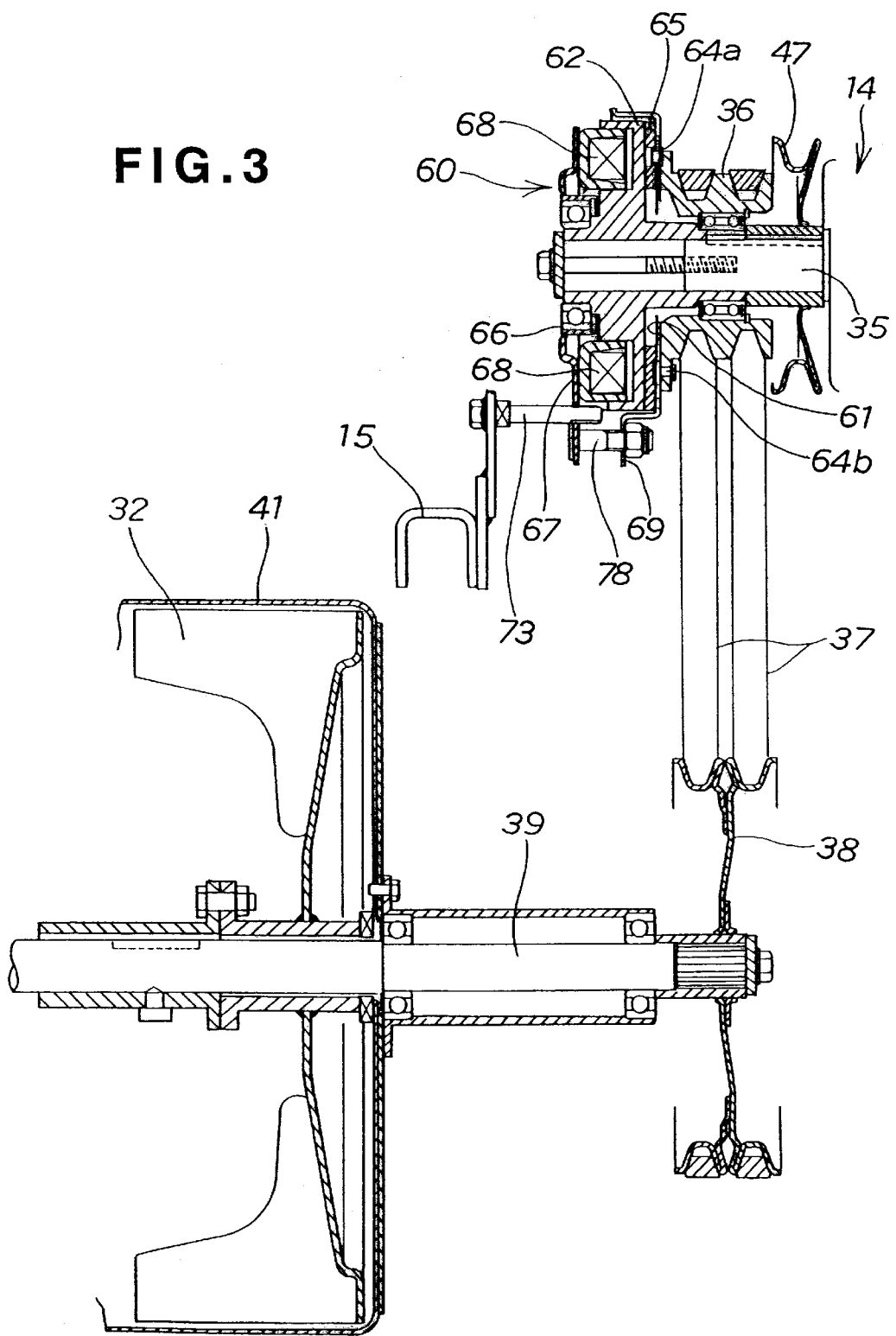
FIG. 3 is a cross sectional view illustrating how an electromagnet clutch, a drive pulley, a blower and a driven pulley employed in the snow removing machine of FIG. 1 are interrelated.
Figure 4:
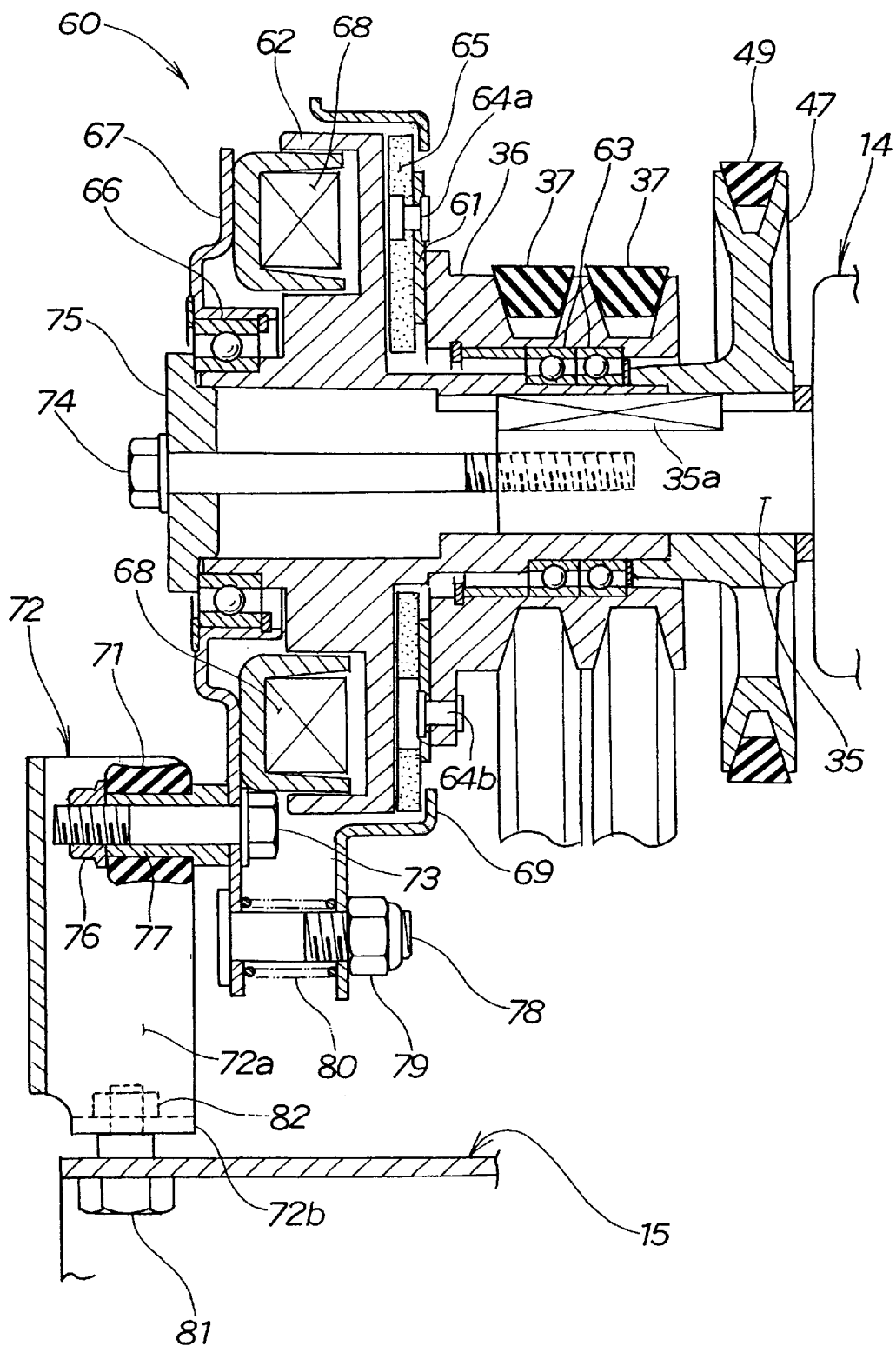
FIG. 4 is an enlarged cross sectional view of the electromagnetic clutch according to the preferred embodiment of the present invention.
Figure 5:
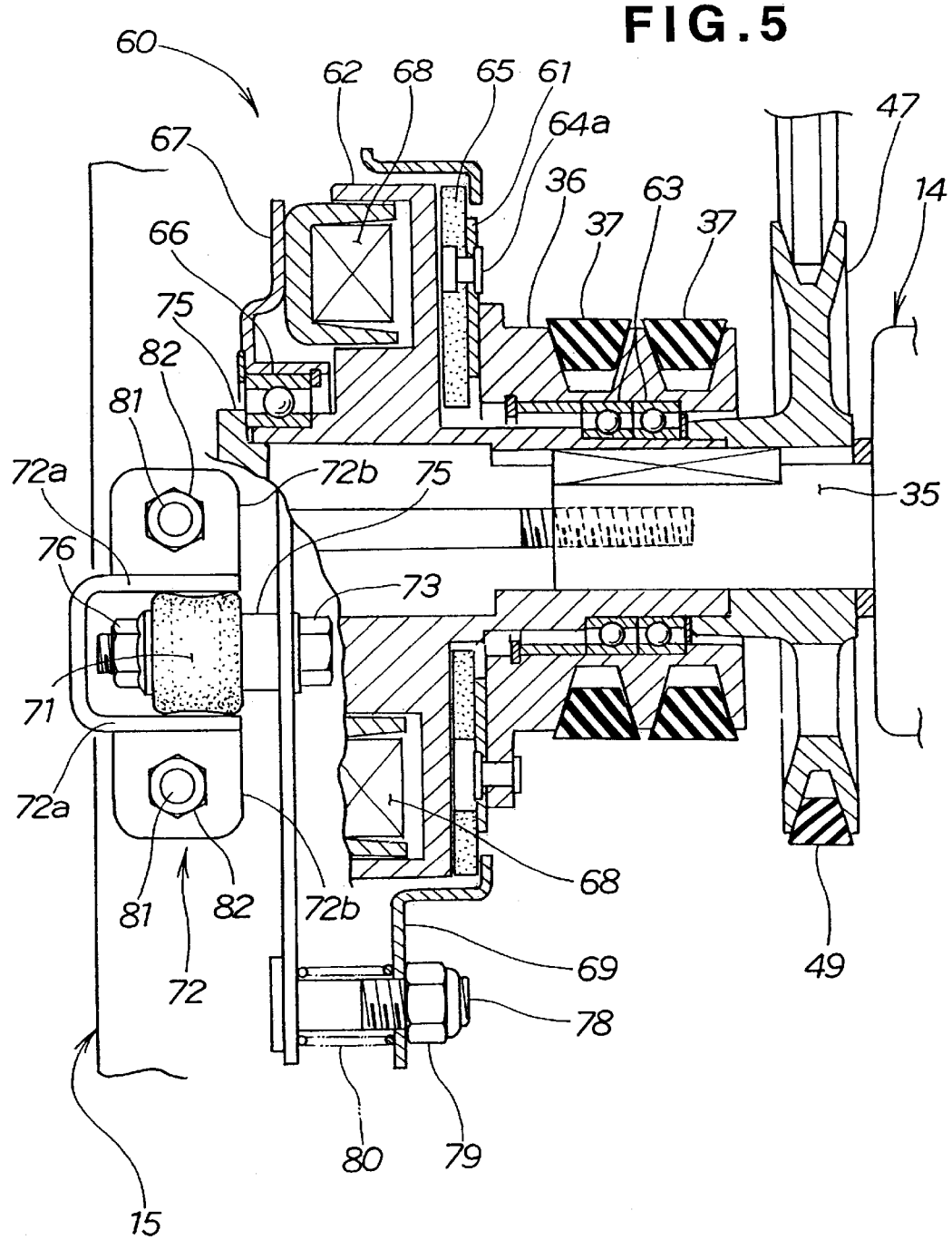
FIG. 5 is a cross sectional view illustrating, in top plan, the electromagnetic clutch of FIG. 4.

FIGS. 3, 4 and 5 chow the electromagnetic clutch 50. In FIG. 3, the electromagnetic clutch 60 is mounted to a forc part of the crankshaft 35 of the engine 14. The drive pulley 36 is mounted to the crankshaft 35 at a position in close proximity to the engine 14. The transmission belts 37, 37 are trained around the drive pulley 36 and the driven pulley 38. The generator drive pulley 47 for the charging generator is connected between the drive pulley 36 and the engine 14.

As shown in FIG. 4, the electromagnetic clutch 60 comprises a rotor 62 as a main member, a drive pulley 36 as a submember, an armature 65, a yoke 67 and an excitation coil 68.

The rotor 62 is coupled to the crankshaft 35 by means of a key 35a. The drive pulley 36 is concentrically mounted to the rotor 62 by means of bearings 63 for free rotational movement. The armature 65 is mounted to the drive pulley 36 via an annular leaf spring 61. The armature 65 is coupled to the leaf spring 61 by means of a plurality of fixing pins 64a, with the leaf spring 61 coupled to the drive pulley 36 by means of a plurality of fixing pins 64b. The yoke 67 is mounted to the rotor 62 via a bearing 66 to allow the rotor 62 to freely rotate. The excitation coil 68 is coupled to the yoke 67.

Energization and deenergization of the excitation coil 68 allows the armature 65 to be retracted to the rotor 62 against a resilient force of the leaf spring 61 and to move away from the rotor 62 by a returning action of the leaf spring 61. That is, the armature 65 is moved toward and away from the rotor 62.

In the electromagnetic clutch 60 thus arranged, energizing the excitation coil 68 by operating the clutch operation button 50 causes the rotor 62 to attract the armature 65 to bring the clutch into a coupled state. As such, the drive pulley 36 is rotated. Rotation of the drive pulley 36 is transmitted to the blower 32 and the auger 31 (see FIG. 2) via the transmission belts 37, 37, the driven pulley 38 and the rotary shaft 39, thereby rotating the blower 32 and the auger 31.

Since the power output of the crankshaft 35 is transmitted to the drive pulley 36 via the electromagnetic clutch 60, there is no need for adopting a belt tensioning clutch as required in the prior art arrangement. For this reason, there is no need for implementing maintenance in every short cycle in consideration of deterioration in a clutch function due to extensions or hardenings of the transmission belts 37, 37. Further, the capability of omitting troublesome extra work such as replacement of the transmission belts 37, 37 and adjustment of tensions of the transmission belts 37, 37 allows the maintenance to be executed in a simplified manner. Furthermore, since the electromagnetic clutch 60 is composed of a unitary component part formed into a single unit, it has a smaller number of component parts than that of the belt tensioning clutch. This makes the clutch mechanism light in weight, thereby preventing an increase in the weight of the snow removing machine while suppressing the same from becoming large in size.

A cover 69, which conceals the rotor 62, is mounted to the yoke 67. The yoke 67 is supported by a support bracket 72 via a resilient member 71. The support bracket 72 is connected to the body frame 15, which serves as the anchoring member, by means of a fixing screw 81.

The rotor 62 and the yoke 67 are mounted to the crankshaft 35 via the fixing plate 75 by means of a bolt 74. The cover 69 is mounted to the yoke 67 via a compression spring 80 by means of a bolt 78 and a nut 79. The compression spring 80 is capable of adjusting the positional relationship of the cover 69 with respect to the yoke 67.

A bolt 73 functions as a detent pin for preventing rotation or the yoke 67. This bolt 73 protrudes outward from an inward portion of the yoke 67, with a protruding portion receiving a stepped collar 77. The resilient member 71 is mounted and fixed to an outer periphery of the stepped collar 77. Screwing a nut 76 to the bolt 73 allows the resilient member 71 and the stepped collar 77 to be mounted to the bolt 73.

The support bracket 72 includes a pair of support walls 72a, 72a with which the resilient member 71 is sandwiched as shown in FIG. 5, and flanges 72b, 72b which are formed by bending lower ends of the support walls 72a, 72a outward, respectively. Fixing these flanges 72b, 72b to the body frame 15 by means of the fixing screw 81 and the nut 82 as shown in FIG. 4 allows the support bracket 72 to be fixedly secured to the body frame 15.

The electromagnetic clutch 60 is structured such that the submember composes of the armature 65 mounted to the drive pulley 36 faces the main member composed of the rotor 62 mounted to the crankshaft 35. Upon excitation of the excitation coil 68 accommodated in the yoke 67, the armature 65 serving as the submember is attracted to the rotor 62 serving as the main member against the resilient force of the leaf spring 61. By such attraction, the drive pulley 36 is brought into drive connection with the rotor 62 to allow rotational force of the crankshaft 35 to be transmitted to the drive pulley 36. Thus, when the excitation coil 58 is energized, a force is exerted on the yoke 67 to coact with the rotor 62 in response to the attractive force applied to the rotor 62 serving as the main member. Further, when the excitation coil 68 is changed over from the turned-on state to the turned-off state, the yoke 67 is imposed with reaction in the sudden disappearance of the attractive force acting on the rotor 62.

Thus, according to the present invention, the bolt 73 serving as the detent member extends from the yoke 67 to allow the resilient member 71 to be mounted to the detent bolt 73, thereby permitting the yoke 67 to be connected to the body frame 15 serving as the anchoring member via the resilient member 71. Such resilient connection mitigates the "interlocking phenomenon of the yoke" or "reacting phenomenon" caused by the ON/OFF states of the excitation coil 68 to reduce vibrations or noises produced by the electromagnetic clutch 60.

The support bracket 72 is secured to the body frame 15 serving as the anchoring member to allow the support walls 72a, 72a to sandwich the bolt 73, serving as the detent member, via the resilient member 71 for thereby suppressing the movement of the bolt 73 caused by the rotational force exerted to the yoke 67. In other words, there is no need to improve mounting accuracy in a vertical direction between the detent bolt 73 and the support bracket 72, thus enabling easy mounting of the electromagnetic clutch 60 to the body frame 15.

FIGS. 6A to 6E shows how the electromagnetic clutch 60 according to the present invention operates.

Figure 6A:
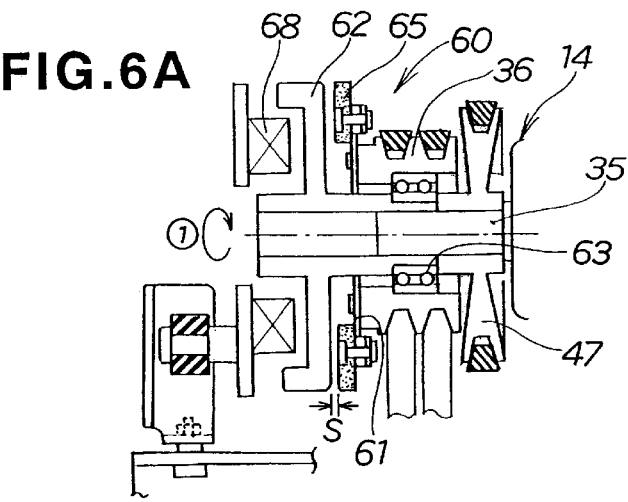
FIGS. 6A to 6E are schematic views illustrating a relationship between the electromagnetic clutch according to the preferred embodiment of the present invention and the drive pulley, and a direction of force applied to a yoke.

In FIG. 6A, the presence of the non-conductive state of the excitation coil 68 allows the armature 65 to move away from the rotor 62 in response to the returning force of the leaf spring 61 to permit a gap S to be defined between the rotor 62 and the armature 65. When the crankshaft 35 rotates in a direction shown by arrow 1 responsive to the start-up of the engine 14, only the pulley 47, for the charging generator, and the rotor 62 rotate. Since the drive pulley 36 is held in an idling state by the bearing 63 with respect to the rotor 62 and thus does not rotate, as shown in FIG. 3, rotation is not transmitted to the driven pulley 38. Accordingly, the snow-removing work section 13 is held in a non-operative condition.

Figure 6B:
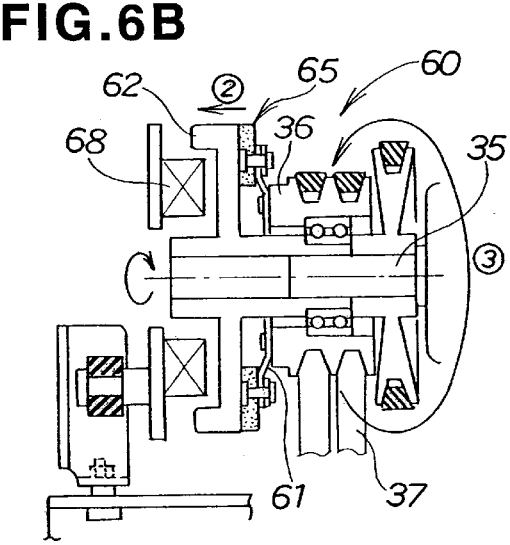

In FIG. 6B, upon turning on of the excitation coil 68, the armature 65 is attracted to the rotor 62 in a direction as shown by arrow ② against the resilient force of the leaf spring 61. Then, rotation of the rotor 62 is transmitted to the drive pulley 36 via the armature 65 and the leaf spring 61, causing the drive pulley 36 to rotate in the same direction as the rotor 62, as shown by arrow ③. Thus, the electromagnetic clutch 60 is held in a coupled condition. Rotation of the drive pulley 36 causes the snow-removing work section 13 shown in FIG. 1 to be driven via the transmission belt 37 and the driven pulley 38.

Figure 6C:
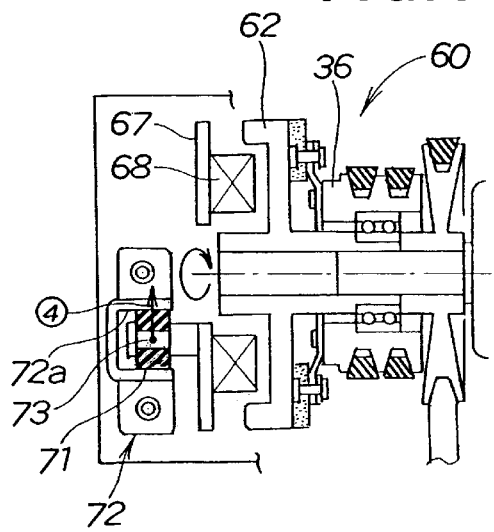

FIG. 6C shows the arrangement of FIG. 6B in plan. When the excitation coil 68 is shifted from the turned-off state shown in FIG. 6A to the turned-on state shown in FIG. 6B, an interlocking phenomenon occurs in the yoke 67, previously remaining in a stationary condition, such that the yoke 67 tends to rotate in the same direction as the rotor 62. As a result, the yoke 67 is caused to swing in a direction as shown by arrow ④ in FIG. 6C. However, since the detent bolt 73 is supported by the support wall 72a of the support bracket 72 via the resilient member 71, the interlocking phenomenon of the yoke 67 is prevented.

Figure 6D:
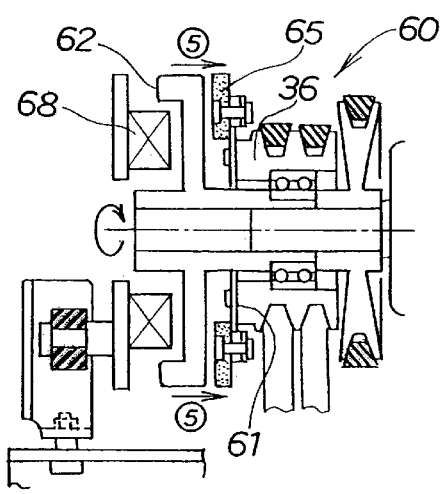

When the excitation coil 68 is shifted from the turned-on condition shown in FIG. 6B to the turned-off condition, as shown in FIG. 6D, the armature 65, which has been attracted to the rotor 62, is moved away from the rotor 62 in a direction as shown by arrow ⑤ by the restoring force of the leaf spring 61. When this occurs, the electromagnetic clutch 60 returns to an interruptive condition shown in FIG. 6D to allow the drive pulley 36 to be brought into the idling condition, thereby interrupting the operation of the snow-removing work section 13 shown in FIG. 1.

Figure 6E:
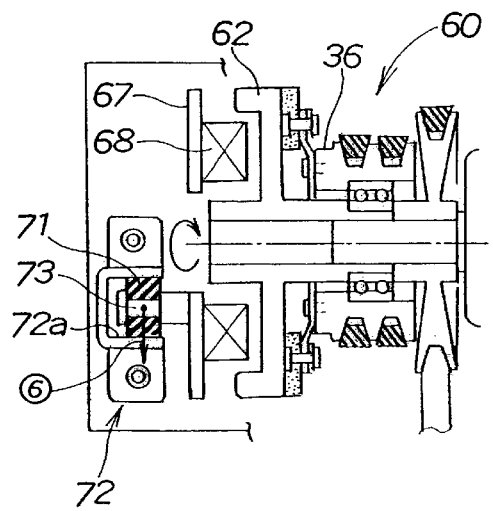

Thus, when the electromagnet clutch 60 is quickly brought into the interruptive condition from the coupled condition, the interlocking phenomenon exerted by the rotor 62 is abruptly released, thereby causing the yoke 67 to be exerted with the reaction force in a direction as shown by arrow ⑥ in FIG. 6E. However, since the detent bolt 73 mounted to the yoke 67 is supported by the support wall 72a of the support bracket 72 via the resilient member 71, the reaction of the yoke 67 is limited. T his results in decrease in vibrations and noises of the electromagnetic clutch 60.

Figure 7A:
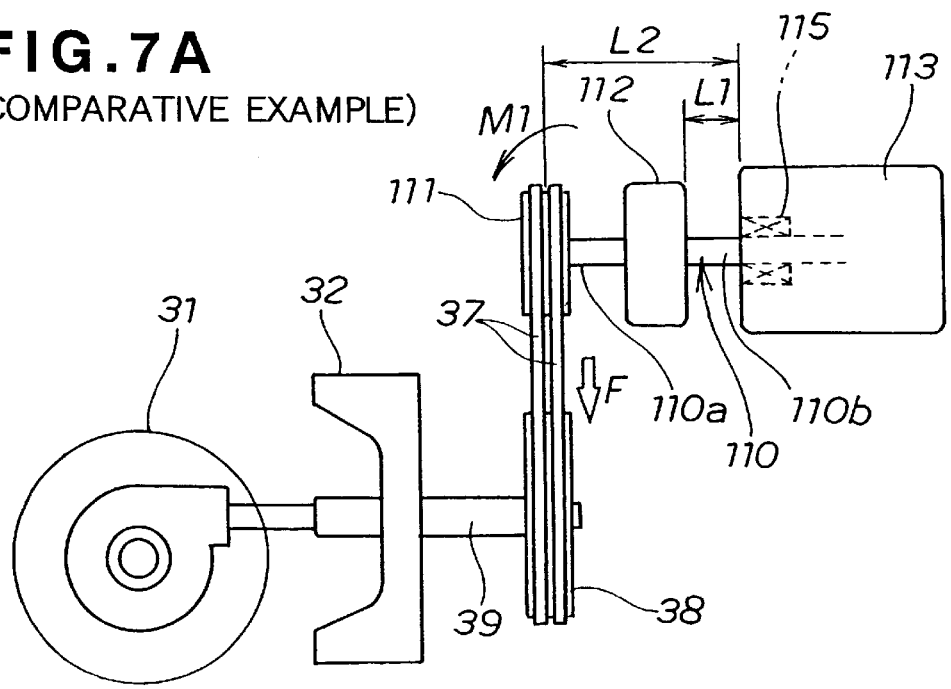
FIGS. 7A and 7B are schematic views illustrating mount positions, according to a comparative example and a preferred embodiment, of the drive pulley and the electromagnetic clutch with respect to an output shaft of an engine.
Figure 7B:
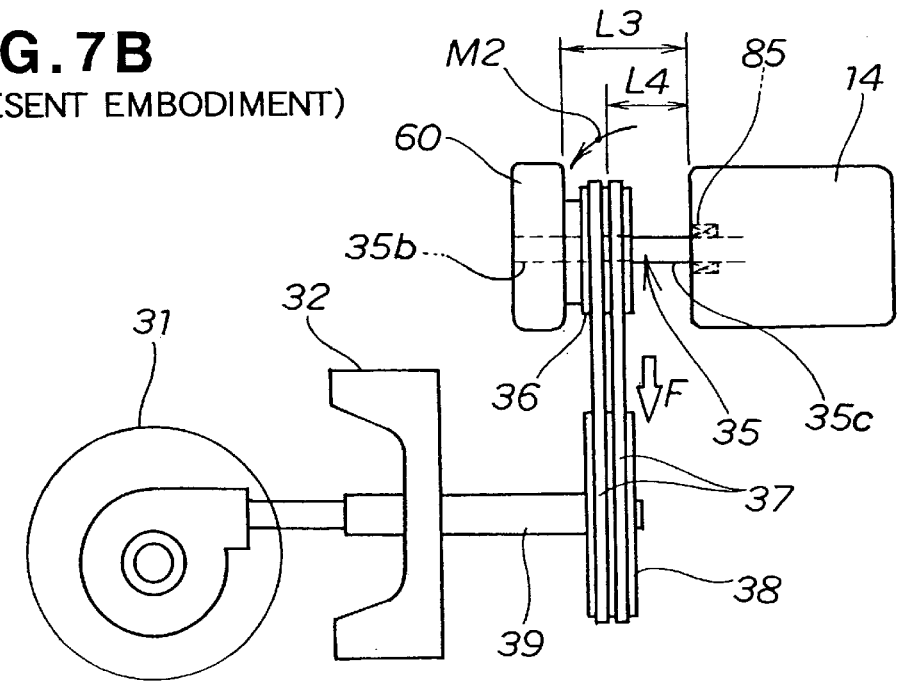

FIGS. 7A and 7B show the mounting positions, in a comparative example and a preferred embodiment, of the electromagnetic clutch relative to the crankshaft 35.

The comparative example shown in FIG. 7A shows a structure wherein a drive pulley 111 is mounted to a distal end 110a of a crankshaft 110 and an electromagnetic clutch 112 is mounted to a proximal end 110b of the crankshaft 110.

The presence of the electromagnet clutch 112 at the proximal end 110b of the crankshaft 110 allows a distance L1 between the electromagnet clutch 112 and the engine 113 to be decreased. For this reason, heat of the engine 113 is easily transferred to the electromagnetic clutch 112, leaving the possibility of decreasing the magnetic force of the electromagnet due to heat of the engine 113 while inviting difficulty in ensuring an adequate space for performing maintenance of the electromagnetic clutch 112 with a resultant deterioration in maintenance capability.

Further, locating the drive pulley 111 at the distal end 110a of the crankshaft 110 causes a distance L2 between the engine 113 and the drive pulley 111 to increase. Consequently, when the drive pulley 111 encounters a load F by the transmission belts 37, 37, the crankshaft 110 is imparted with a large magnitude of bending moments M1 (M1=F×L2). For this reason, the bearing 115 supporting the crankshaft 110 is applied with a large load, thus requiring the bearing 115 to be largely sized.

In the preferred embodiment shown in FIG. 7B, there is shown an example wherein the electromagnetic clutch 60 is mounted to the crankshaft 35 at the distal end 35b thereof and the drive pulley 36 is mounted to the base side 35c of the crankshaft 35. Thus, locating the electromagnetic clutch 60 away from the engine 14 causes a distance L3 between the engine 14 and the electromagnet clutch 60 to increase. For this reason, heat generated by the engine during its operation is hardly transferred to the electromagnetic clutch 60 for precluding reduction in the magnetic force due to the heat of the engine 14 while enabling an adequate space to be enhanced for maintenance of the electromagnet clutch 40 to provide improved maintenance capability.

Moreover, since the drive pulley 36 is located at the base portion 35c of the crankshaft 35, it is possible for a distance L4 between the engine 14 and the drive pulley 36 to be decreased. As a consequence, when the drive pulley 36 encounters the load F owing to the transmission belts 37, 37, it is possible to decrease the magnitude of bending moments M2 (M2=F×LA) to be exerted to the crankshaft 35. As a result, the load exerted to the bearing 85 supporting the crankshaft 35 can be decreased, enabling the bearing 85 to be miniaturized and to be light in weight.

Now, a mounting structure for an electromagnet clutch according to another preferred embodiment will be described with reference to FIG. 8, wherein like parts are designated by the same reference numerals as those of the embodiment of FIG. 5 and their description is therefore omitted.

Figure 8:
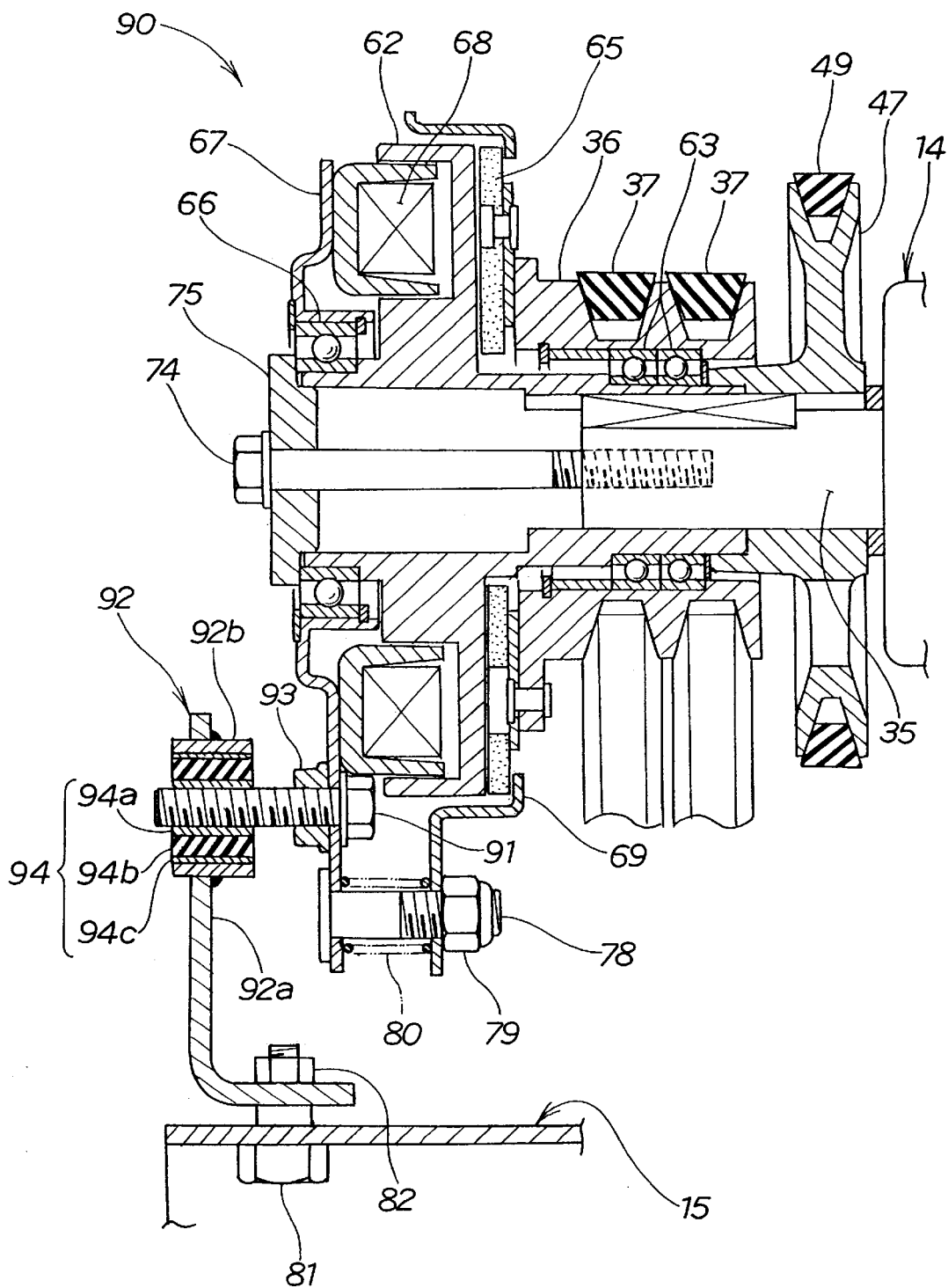
FIG. 8 is a cross sectional view of the electromagnetic clutch according to another preferred embodiment of the present invention.

An electromagnetic clutch 90 of the embodiment shown in FIG. 8 is fixedly secured to the body frame 15, serving as the anchoring member, via a detent bolt 91 secured to a lower end of the yoke 67 and a support bracket 92 having an L-shaped cross section. The detent bolt 91 is fixed to the yoke 67 with a nut 93. The detent bolt 91 has a distal end portion to allow a cylindrical resilient member 94 to be inserted thereto for mounting. The support bracket 92 has a cylindrical holder portion 92b fixedly secured to an upper area of a body portion 92a. The support bracket 92 has a lower-bent distal end fixedly secured to the body frame 15 using a bolt 81 and a nut 82.

The resilient member 94 is comprised of an inner peripheral portion 94a, an intermediate portion 94b and an outer peripheral portion 94c. The intermediate portion 95b forms a substantially resilient portion. The inner peripheral portion 94a and the outer peripheral portion 94c have higher hardness than that of the intermediate portion 94b. The resilient member 94 is fitted in the holder portion 92b of the support bracket 92. Thus, the presence of higher hardness selected in the inner peripheral portion 94a, held in contact with the detent bolt 91, and the outer peripheral portion 94c held in contact with the holder portion 92b of the support bracket 92 allows the resilient member 94 to entirely have improved durability.

With such a structure set forth above, since the electromagnetic clutch 90 of the preferred embodiment has a feature wherein the entire periphery of the resilient member 94 is retained by the support bracket 92 secured to the body frame 15 serving as the anchoring member, the "interlocking phenomenon of the yoke 67" is alleviated in the same manner as that of the preferred embodiment shown in FIGS. 4 and 5 while enabling the electromagnetic clutch 90 from being vibrated in overall directions.

In the preferred embodiment described above, although the snow removing machine has been discussed in conjunction with a walk behind type snow removing machine accompanied by an operator walking behind the machine, it is to be understood that the present invention is not limited thereto and may be applied to a riding type snow removing machine wherein an operator rides on a frame body for performing the required work.

This present disclosure is related to the subject matter of Japanese Patent Application No. 2001-120394, filed Apr. 18, 2001, and Japanese Patent Application No. 2001-278556, filed Sep. 13, 2001, the disclosures of which are expressly incorporated herein by reference in their entireties.

What is claimed is:

1. A snow removing machine comprising:
   a prime mover having an output shaft for outputting power from the prime mover, the output shaft having a proximal end portion close to a body of the prime mover and a distal end portion remote from the body of the prime mover;
   a snow-removing work section, having a rotary shaft driven by power from the output shaft of the prime mover to perform snow-removing work;
   a drive pulley rotatably mounted on the proximal end portion of the output shaft for free rotational movement relative to the output shaft;

a driven pulley fixedly connected to the rotary shaft of the snow-removing work section;

a transmission belt extending between the drive pulley and the driven pulley; and an electromagnetic clutch mounted on the distal end portion of the output shaft with the drive pulley disposed between the electromagnetic clutch and the body of the prime mover, the electromagnetic clutch being operative to connect or disconnect the output shaft and the drive pulley for selectively effecting or blocking power transmission between the output shaft and the drive pulley.

2. A snow removing machine according to claim 1; wherein the electromagnetic clutch comprises a main member coupled to the output shaft for joint rotation with the output shaft, a submember connected to the drive pulley and disposed in opposed relation to the main member, a yoke disposed on the opposite side of the main member with respect to the submember and rotatably mounted on a part of the main member for free rotational movement relative to the main member, and an excitation coil mounted on the yoke for causing the submember to be attracted against the main member upon energization of the excitation coil so that rotational power of the output shaft of the prime mover is transmitted from the main member via the submember to the drive pulley.

3. A snow removing machine according to claim 2; further comprising preventing means for preventing the yoke from rotating in unison with the main member, the preventing means comprising a detent member projecting from the yoke in a direction parallel to an axis of the output shaft, a resilient member mounted on the detent member, and an anchoring member fixed in position and engaged with the resilient member to anchor the detent member in position against movement relative to the anchoring member.

4. A snow removing machine according to claim 3; wherein the anchoring member includes a support bracket having a pair of confronting support walls, and the resilient member is held between the support walls of the support bracket.

5. A snow removing machine according to claim 3, wherein the anchoring member includes a support bracket having a cylindrical holder portion, and the resilient member has a cylindrical shape and is fitted in the cylindrical holder portion of the support bracket.

6. A snow removing machine according to claim 5, wherein the cylindrical resilient member is comprised of an inner peripheral portion forming an inner periphery of the cylindrical resilient member, an outer peripheral portion forming an outer periphery of the cylindrical resilient member, and an intermediate portion disposed between the inner peripheral portion and the outer peripheral portion and forming a body part of the cylindrical resilient member, the inner and outer peripheral portions having a higher hardness than the intermediate portion.

7. A snow removing machine comprising: a prime mover having an output shaft for outputting rotary power from the prime mover, the output shaft having a proximal end portion proximate to a body of the prime mover and a distal end portion remote from the body of the prime mover; a snow-removing section having a rotary shaft for performing snow removal in response to rotation of the rotary shaft; a drive pulley rotatably mounted on the output shaft; a driven pulley fixedly connected to the rotary shaft; at least one transmission belt extending around the drive and driven pulleys for transmitting rotary power from the drive pulley to the driven pulley to thereby rotationally drive the rotary shaft; and an electromagnetic clutch mounted on the distal end portion of the output shaft with the drive pulley disposed between the electromagnetic clutch and the body of the prime mover, the electromagnetic clutch being switchable between a clutching state for connecting the drive pulley to the output shaft for rotation therewith and a non-clutching state for disconnecting the drive pulley from the output shaft.

8. A snow removing machine according to claim 7; including another drive pulley fixedly connected to the output shaft for rotation therewith for rotationally driving an accessory of the prime mover, the another drive pulley being disposed between the first-mentioned drive pulley and the body of the prime mover.

9. A snow removing machine according to claim 7; wherein the electromagnetic clutch comprises a main member connected to the output shaft for rotation therewith, a submember connected to the drive pulley for rotation therewith, the submember being disposed in opposed confronting relation with respect to the main member and being movable into and out of engagement with the main member to define the clutching and non-clutching states, a yoke rotatably mounted on the main member for free rotational movement relative thereto, and an energizeable excitation coil carried by the yoke and switchable between an energized state to effect movement of the submember into engagement with the main member and a deenergized state to enable movement of the submember out of engagement with the main member.

10. A snow removing machine according to claim 9; further including a detent member connected to and projecting outwardly from the yoke; a resilient member connected to the detent member; and an anchoring member fixedly mounted on a frame portion of the snow removing machine, the anchoring member having two spaced-apart opposed wall portions with the detent member disposed therebetween such that the resilient member engages the opposed wall portions thereby preventing the yoke from rotating together with the main member.

11. A snow removing machine according to claim 10; wherein the resilient member has a cylindrical shape and is comprised of an inner peripheral portion forming an inner periphery of the cylindrical resilient member, an outer peripheral portion forming an outer periphery of the cylindrical resilient member, and an intermediate portion disposed between the inner peripheral portion and the outer peripheral portion and forming a body part of the cylindrical resilient member, the inner and outer peripheral portions having a higher hardness than the intermediate portion.

12. A snow removing machine according to claim 11; wherein the anchoring member includes a holder portion having a cylindrical opening defined by a cylindrical inner surface, the detent member being disposed in the cylindrical opening, and diametrically opposed portions of the cylindrical inner surface constituting the two spaced-apart opposed wall portions of the anchoring member.

* * * * *